United States Patent [19]
Cain

[11] Patent Number: 6,028,846
[45] Date of Patent: Feb. 22, 2000

[54] METHOD AND SYSTEM FOR TESTING REAL-TIME DELIVERY OF PACKETS OF DATA

[75] Inventor: Michael E. Cain, Arvada, Colo.

[73] Assignees: U S West, Inc., Denver; MediaOne Group, Inc., Englewood, both of Colo.

[21] Appl. No.: 08/928,009

[22] Filed: Sep. 11, 1997

[51] Int. Cl.[7] .............................. G06F 11/00; H04L 12/28; H04L 12/56
[52] U.S. Cl. .......................... 370/250; 370/401; 709/220; 709/249
[58] Field of Search ..................................... 370/241, 242, 370/245, 252, 254, 389, 401, 402; 714/1–4; 709/201, 220, 249, 230, 227, 217, 218, 219, 245

[56] References Cited

U.S. PATENT DOCUMENTS

| | | | |
|---|---|---|---|
| 5,278,823 | 1/1994 | Handel | 370/401 |
| 5,388,262 | 2/1995 | Hillis | 714/1 |
| 5,442,639 | 8/1995 | Cowder et al. | 371/20.1 |
| 5,568,471 | 10/1996 | Hershey et al. | 370/245 |
| 5,598,532 | 1/1997 | Moshe Liron | 370/254 |
| 5,600,632 | 2/1997 | Schulman | 370/252 |
| 5,732,213 | 3/1998 | Gessel et al. | 370/241 |
| 5,745,758 | 4/1998 | Shaw et al. | 709/201 |

*Primary Examiner*—Alpus H. Hsu
*Assistant Examiner*—Afsar M. Qureshi
*Attorney, Agent, or Firm*—Brooks & Kushman

[57] ABSTRACT

A method and system for testing real-time delivery of packets of data in an application utilized in a computer network includes a first host computer, a second host computer, and a simulator all configured on a local area network segment of a second computer network. A first address is assigned to the first host computer and a second address is assigned to the second host computer. The simulator is configured as a router through which the first and second host computers communicate with each other. Any combination of possible network conditions associated with the computer network are entered into the simulator. The packets of data are formed and transmitted from one of the first and second host computers to the simulator and processed according to the entered network conditions to obtain simulation data.

21 Claims, 3 Drawing Sheets

METHOD AND SYSTEM FOR TESTING REAL-TIME DELIVERY OF PACKETS OF DATA

TECHNICAL FIELD

This invention relates to methods and systems for testing real-time delivery of packets of data in a computer network for use in application testing.

BACKGROUND ART

Many communication networks employed today, such as Ethernet Systems and other local area networks (or LAN's), consist of a series of components such as monitors, access terminals and other peripherals which receive and transmit a variety of communication signals either directly, via one or more intermediate nodes, or through a server node. The communication can be over a physical medium (such as electrical or fiber-optic cable) or by wireless means (using radio waves, micro-waves, or infrared waves).

A protocol is a set of predefined rules that govern how two or more processes communicate and interact to exchange data. The processes may be on the same machine or on different machines. Protocols are generally associated with particular services or tasks, such as data packaging or packet routing. A protocol specifies rules for setting up, carrying out, and terminating a communications connection, and also specifies the format the information packets must have when traveling across the connection.

One widely used protocol is the Internet Protocol (IP). IP is the widely supported network layer protocol for the Internet. This protocol defines and routes datagrams across the Internet and provides connectionless transport service. The IP protocol uses packet switching and provides a best-effort service for packet delivery. IP network components have become fast enough that real-time delivery of services such as streamed audio and video data is now feasible.

However, such real-time applications do not always function as expected in the presence of network impairments, such as delay, packet loss, and different access methods between the host computers and the network. Testing of real-time applications is hard to accomplish due to the difficulty of creating desired test conditions in a reliable and reproducible manner. It is not practical to modify the commercial application to simulate the impairment conditions.

Another known method for testing such applications involves building a network having a plurality of computers 10 encompassing all the possible access methods connected to a server 12 via a router 14, as shown in FIG. 1. For example, one test configuration may be a computer having ISDN (Integrated Services Digital Network) access at one end, a second computer having ADSL (Asymmetric Digital Subscriber Loop) access at the other end, a mean network delay of 200 msec and 5% network packet loss. This method is not realistic to model packet loss since the router 14 is only serving three or four computers 10 rather than hundreds of computers in a"true" network. This method is also time consuming and expensive.

Thus, there exists a need for an inexpensive and reliable method for testing the impact of different access methods and network conditions on various real-time applications. Such a method should also be transparent to the application.

DISCLOSURE OF THE INVENTION

It is thus a general object of the present invention to provide an inexpensive and reliable method and system for testing real-time delivery of packets of data in an application utilized in a computer network having a plurality of local area network segments and a plurality of network conditions associated with each of the plurality of local area network segments.

In carrying out the above object and other objects, features, and advantages of the present invention, a method is provided for testing real-time delivery of packets of data in an application utilized in a computer network. The method includes the steps of configuring a first and second host computer to have first and second addresses, respectively. The method also includes the step of configuring a simulator as a router through which the first and second host computers communicate with each other according to a first and second one of the plurality of network conditions associated with a first and second one of the plurality of local area network segments, respectively. Still further, the method includes the step of forming the packets of data in the application at one of the first and second host computers. Finally, the method includes the steps of transmitting the packets of data from the one of the first and second host computers to the simulator and processing the packets of data according to the first and second one of the plurality of network conditions to obtain simulation data.

In further carrying out the above object and other objects, features, and advantages of the present invention, a system is also provided for carrying out the steps of the above described method. The system includes a first host computer configured on a local area network segment of a second computer network and having a first address. The system also includes a second host computer configured on the local area network segment of the second computer network and having a second address. The system further includes a simulator configured on the local area network segment of the second computer network acting as a router through which the first and second host computers communicate with each other according to a first and second one of the plurality of network conditions associated with a first and second one of the plurality of local area network segments, respectively. The packets of data in the application are formed at one of the first and second host computers and transmitted from the one of the first and second host computers to the simulator, wherein the simulator processes the packets of data according to the first and second one of the plurality of network conditions to obtain simulation data.

The above object and other objects, features and advantages of the present invention are readily apparent from the following detailed description of the best mode for carrying out the invention when taken in connection with the accompanying drawings.

BEST MODES FOR CARRYING OUT THE INVENTION

Figure 1:
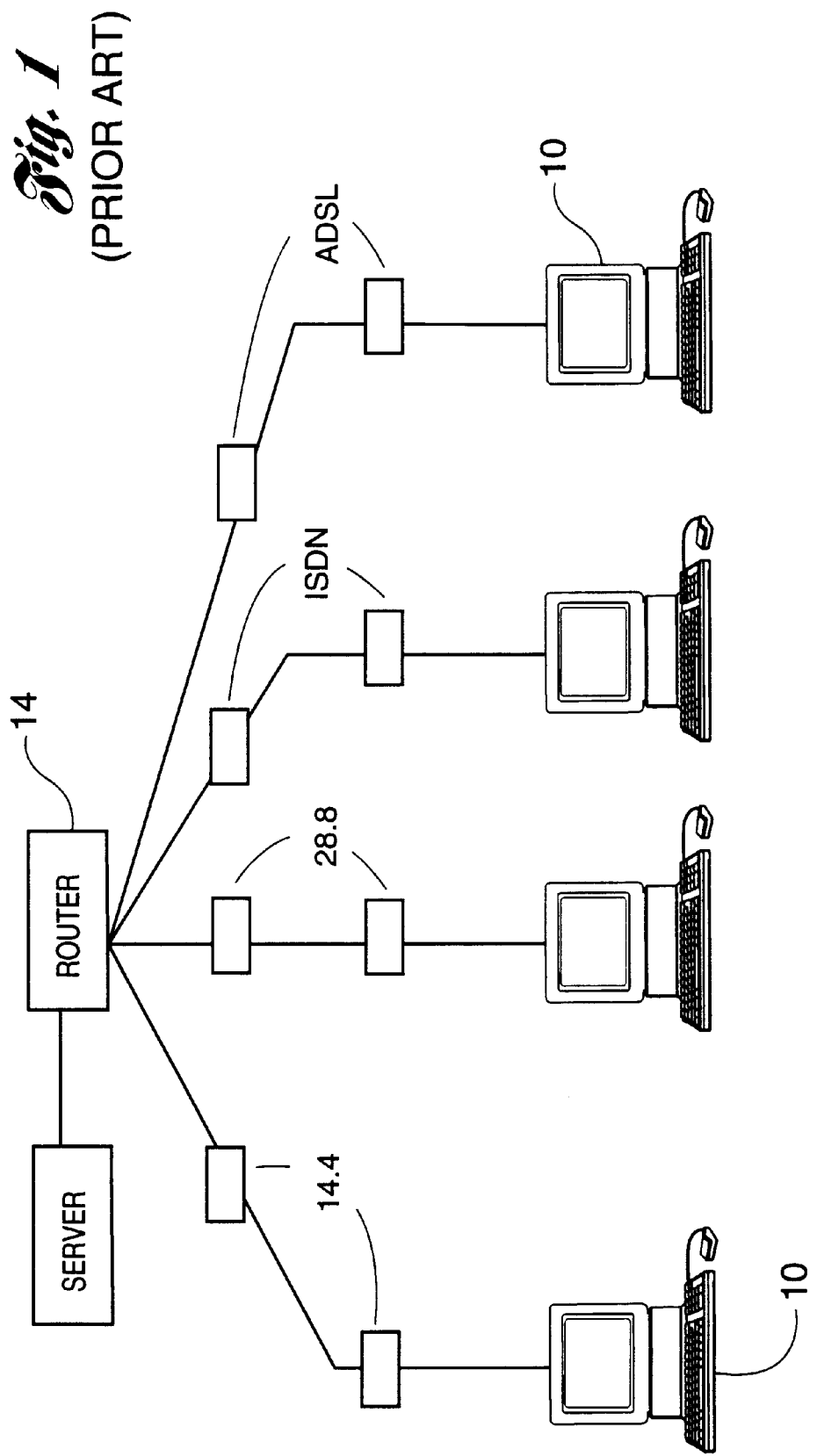
FIG. 1 is a schematic diagram of a prior art simulation network for testing real-time applications.
Figure 2:
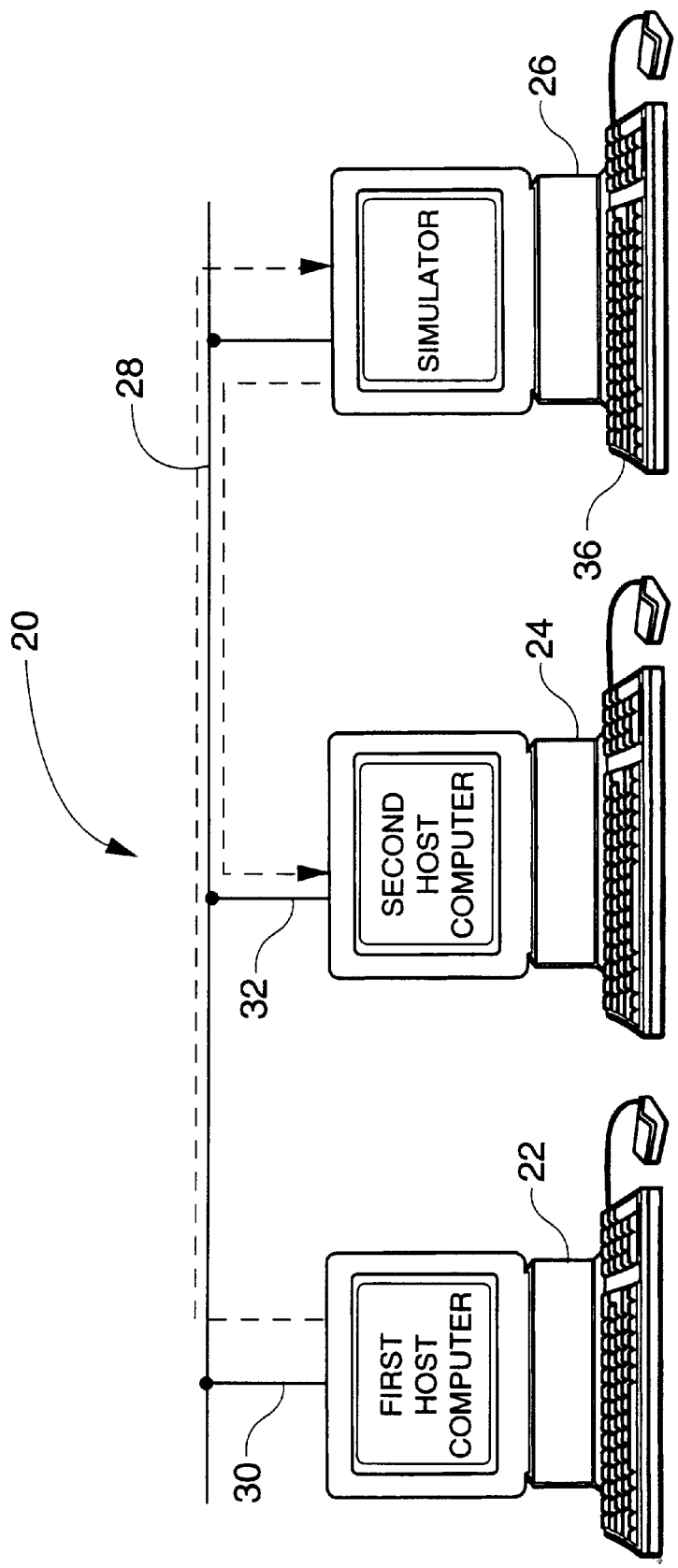
FIG. 2 is schematic block diagram of the system of the present invention.

Turning now to FIG. 2, there is shown a schematic block diagram of the system of the present invention, denoted generally by reference numeral 20. The system 20 includes a first host computer 22, a second host computer 24, and a simulator 26, or personal computer. First host computer 22, second host computer 24 and simulator 26 are all connected to the same local area network (LAN) 28, such as Ethernet, Token Ring, Broadband Ethernet, etc. The following description will assume the use of Ethernet, although the invention can clearly be applied with necessary modifications to other LAN technologies. Similarly, the description is based on an application involving only two test host computers, although the system can clearly be applied to applications using more than two host computers.

The host computers 22,24 forming the application under test must route IP packets through the simulator 26. This is accomplished by configuring the host computers 22,24 in any of three appropriate fashions. Different methods are required because different test host computers will have different routing capabilities depending on the operating system used by each.

In the first method, host computers 22,24 and simulator 26 are assigned addresses within the same IP subnetwork such as, for example:
Host Computer 22 130.13.17.1
Host Computer 24 130.13.17.2
Simulator 26 130.13.17.3
This method is applied when the host computers 22,24 are capable of full host routing. Each host computer 22,24 is instructed, typically by manipulation of a routing table that packets addressed to the other host computer (at the IP level) should be sent to the simulator 26 (using Ethernet level addressing). The simulator 26 will forward the packets to the intended destination.

Not all host computers are capable of full host routing. In the second method, the simulator 26 implements virtual IP addresses for each host computer 22,24. These virtual addresses have meaning only to the simulator 26:

|  | Real | Virtual |
|---|---|---|
| Host Computer 22 | 130.13.17.1 | 192.168.1.1 |
| Host Computer 24 | 130.13.17.2 | 192.168.1.2 |
| Simulator 26 | 130.13.17.3 | N/A |

Each host computer 22,24 is instructed again through a routing table or similar means, that packets addressed to the 192.168 subnetwork should be sent to the simulator 26 for appropriate forwarding. In this method, the portion of the distributed application running on each host computer 22,24 must be given the virtual address for the other machine. When this method is used, the simulator 26 performs virtual-to-real and real-to-virtual address substitution along with other modifications to maintain packet integrity required by the IP protocols.

Not all applications will accept the virtual IP address. In the third method, the host computers 22,24 are assigned addresses for different IP subnetworks and the simulator 26 is assigned two distinct addresses, one on each subnetwork. Assigning two addresses to the same host interface is called IP aliasing and must be supported by the simulator 26:
Host Computer 22 192.168.1.1
Host Computer 24 192.168.2.1
Simulator 26 192.168.1.2, 198.162.2.2
Where it can be used, the first addressing scheme is preferred because it provides minimal disruption of normal frost operation within the context of a larger network. The second scheme provides more disruption but compensates for limitations of some host's routing abilities. The third scheme provides the most disruption.

The current simulator 26 implements models of the two impairments of primary concern in contemporary IP networks—packet loss and variable delay. Less common impairments such as out-of-order delivery and packet duplication are not modeled but could clearly be added.

There are two sources of packet loss. The first source of packet loss is overall packet loss that occurs randomly due to any number of reasons such as, for example, disconnection of the network or transmission impairments. This type of packet loss is simulated through the use of a standard pseudo random number approach. That is, the user of the system 20 defines an overall packet loss, such as 5%, to be part of the network conditions.

Another source of packet loss is loss due to memory constraints of the network router(s). When there is a mismatch in access speed between the subnetworks, a back-up of packets occur at the router due to the size of the memory of the router. The router discards excess packets when the memory is exceeded. This type of packet loss is simulated by specifying how much memory, or buffering capability, is available to simulator 26.

Two models of delay sources are included in the simulator 26. The first model is of overall network delay. This model is implemented by generating pseudo-random numbers from a probability distribution chosen by the user. These delay numbers are modified so that packets are delivered in proper order.

The second delay model corresponds to the different speeds of different network access methods. The transmit and receive rate of a few different access methods is summarized below:

| Access Type | Transmit Rate | Receive Rate |
|---|---|---|
| Dial Up (14.4) | 14.4 kbps | 14.4 kbps |
| Dial Up (28.8) | 28.8 kbps | 28.8 kbps |
| ISDN | 64 kbps | 64 kbps |
| ADSL | 768 kbps | 64 kbps |
| T1 | 1.544 Mbps | 1.544 Mbps |
| Cable Modem | 4 Mbps | 20 Mbps |

As an example, a typical packet may be 500 or 600 bytes long. A 24 kbps access method would transmit data at 3000 bytes/sec [(24,000 bits/sec)/(8 bits/byte)]. For 600 bytes, it takes 200 msec to transmit the entire packet of data. In an IP network, the entire packet must be received by the network or host computer before it can be processed or forwarded.

After specifying the desired network conditions, simulator 26 is ready to simulate the effects of various network conditions associated with a given computer network on a real-time application. As discussed above, simulator 26 receives all IP packets of data sent to its physical address. Non-IP packets are discarded. IP packets are processed according to network conditions 24. After performing the necessary packet loss and delay calculations, simulator 26 stores the packet in memory until the proper time and then sends the packet to its intended destination. Since this delivery is done in real time, the effects of network conditions can be observed directly for subjective analysis.

Because all packets of interest from the tested application pass through the simulator 26, the simulator 26 can also function as a measurement device. For each packet that the simulator 26 processes, critical information can be recorded: the time of arrival, the size and the source and destination addresses. This type of information can be used to characterize many types of important application behavior under different network conditions.

Figure 3:
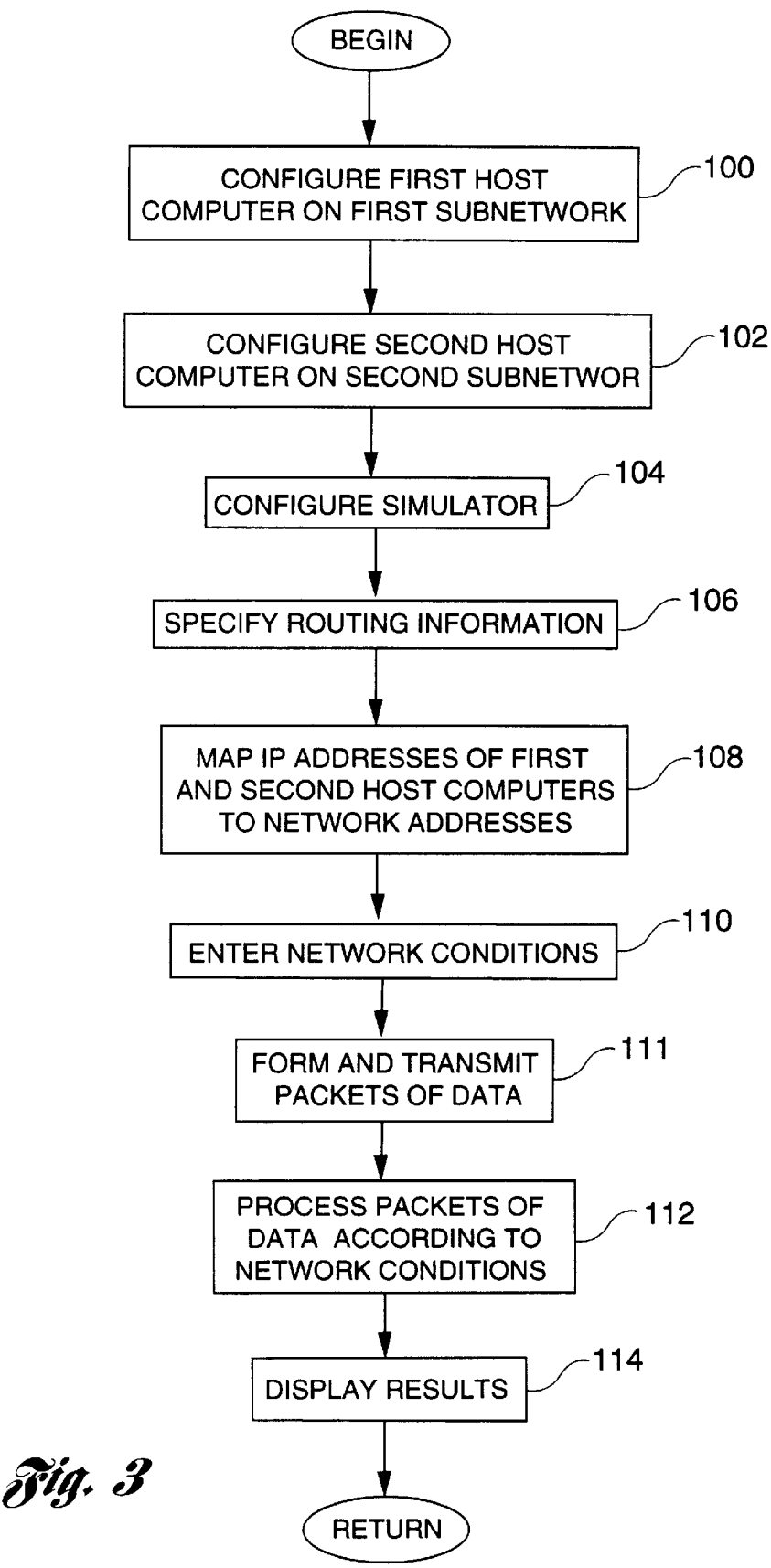
FIG. 3 is a flow diagram illustrating the general sequence of steps associated with the operation of the present invention.

The method of the present invention will be described in conjunction with FIG. 3 utilizing an example test set-up in which the simulator 26 acts as a router through IP aliasing. The first and second hosts 22, 24 are configured on a first and second subnetwork, respectively, as shown at blocks 100 and 102. The IP properties of first host 22 are set so that the first host 22 has a first address, such as an IP address 192.168.1.1. First host 22 also has a gateway address associated therewith, such as 192.168.1.2. The 192.168 address block is reserved for private networks and normal routers will not pass packets using addresses in this range. Thus, the use of these addresses isolates first and second hosts 22, 24 from the rest of the world.

Similarly, second host 24 is assigned a second address, such as an IP address of 192.168.2.1. Second host 24 is also assigned a corresponding gateway address of 192.168.2.2. First and second hosts 22, 24 are on separate subnetworks according to the normal rules for IP protocol and, thus, will not attempt to communicate with each other directly. First and-second hosts 22, 24 send their packets of data to simulator 26 for routing.

Simulator 26 is configured next, as shown at block 104. Simulator 26 preferably runs the Linux Operating System with IP aliasing options enabled. IP aliasing allows a host to have multiple IP addresses associated with a single physical interface. Two IP aliases are needed and created for simulator 26. These addresses are preferably set using the ifconfig command as follows:
/sbin/ifconfig eth0:1 192.168.1.2
/sbin/ifconfig eth0:2 192.168.2.2

Once the aliases are created, routing information must be specified, as shown at block 106. The routing tables in the Linux IP stack allow more options than those used by simpler systems such as Windows. Routing is configured using the route command as follows:
/sbin/route add -host 192.168.1.1 eth0:1
/sbin/route add -host 192.168.2.1 eth0:2
These routes are needed to enable communication between first and second hosts 22, 24.

Next, the IP addresses of first and second hosts 22, 24 must be mapped to their Ethernet addresses, as shown at block 108. This is accomplished utilizing a configuration file as follows:
node 1 ip 192.168.1.1 ethernet 08:00:07:fa:ac:c3
node 2 ip 192.168.2.1 ethernet 00:00:c:8a:5f:0f,
where IP addresses are in dot-decimal notation and Ethernet addresses are in colon-hexadecimal notation.

Before running the simulation, the network conditions are entered, as shown at block 110. Such conditions include, but are not limited to, the rate at which packets are dropped, the distribution from which the network delay values are drawn (e.g., uniform, normal or exponential), the mean of the delay distribution, and the transmit and receive rate for different access arrangements.

The packets of data are then formed at one of the first and second hosts 22, 24 and transmitted to simulator 26, as shown at block 111. Simulator 26 then processes the packets of data according to the entered network conditions, as shown at block 112. The results may be analyzed for further development of the application.

The data may also be transmitted to the other one of the first and second hosts 22, 24, and the results displayed on a display, block 114. This allows the user to view the results of the real-time simulation on either first host 22 or second host 24 for subjective analysis.

While the best modes for carrying out the invention have been described in detail, those familiar with the art to which this invention relates will recognize various alternative designs and embodiments for practicing the invention as defined by the following claims.

What is claimed is:

1. In a first computer network having a first host computer, a second host computer and a simulator all connected on a local area network segment, a method for testing real-time delivery of packets of data in an application utilized in a second computer network having a plurality of local area network segments and a plurality of network conditions associated with each of the plurality of local area network segments, the method comprising:

configuring the first and second host computers to have first and second addresses, respectively;

configuring the simulator as a router through which the first and second host computers communicate with each other according to a first and second one of the plurality of network conditions associated with a first and second one of the plurality of local area network segments, respectively;

forming the packets of data in the application at one of the first and second host computers;

transmitting the packets of data from the one of the first and second host computers to the simulator; and processing the packets of data according to the first and second one of the plurality of network conditions to obtain simulation data.

2. The method as recited in claim 1 wherein the first and second addresses identify the first and second host computers as being configured on a first subnetwork of the local area network segment and wherein configuring the simulator includes configuring the simulator to have a simulation address associated therewith identifying the simulator as being configured on the first subnetwork, and wherein transmitting the packets of data includes transmitting the packets of data based on the first and second addresses and the simulation address.

3. The method as recited in claim 2 wherein the first and second addresses include real and virtual addresses and wherein transmitting the packets of data includes transmitting the packets of data based on the real and virtual addresses and the simulation address.

4. The method as recited in claim 1 wherein the first address identifies the first host computer as being configured on a first subnetwork of the local area network segment and the second address identifies the second host computer as being configured on a second subnetwork, different from the first subnetwork and wherein configuring the simulator includes configuring the simulator to have a first and second gateway address associated therewith, the first gateway address for allowing the first host computer to communicate with the second subnetwork, the second gateway address for allowing the second host computer to communicate with the first subnetwork, and wherein transmitting the packets of data includes transmitting the packets of data based on the first and second addresses and the first and second gateway addresses.

5. The method as recited in claim 1 further comprising:
transmitting the packets of data from the simulator to the other one of the first and second host computers.

6. The method as recited in claim 1 further comprising displaying the simulation data at the other one of the first and second host computers.

7. The method as recited in claim 1 wherein the first and second one of the plurality of network conditions include a network delay.

8. The method as recited in claim 1 wherein the first and second one of the plurality of network conditions include a first and second access speed for the first and second one of the plurality of local area network segments.

9. The method as recited in claim 8 wherein the first and second access speeds are different.

10. The method as recited in claim 1 wherein the first and second one of the plurality of network conditions include a packet loss rate.

11. A system for testing real-time delivery of packets of data in an application utilized in a computer network having a plurality of local area network segments and a plurality of network conditions associated with each of the plurality of local area network segments, the system comprising:

a first host computer configured on a local area network segment of a second computer network and having a first address;

a second host computer configured on the local area network segment of the second computer network and having a second address;

a simulator configured on the local area network segment of the second computer network, the simulator acting as a router through which the first and second host computers communicate with each other according to a first and second one of the plurality of network conditions associated with a first and second one of the plurality of local area network segments, respectively; and wherein the packets of data in the application are formed at one of the first and second host computers and transmitted from the one of the first and second host computers to the simulator, wherein the simulator processes the packets of data according to the first and second one of the plurality of network conditions to obtain simulation data.

12. The system as recited in claim 11 wherein the simulator includes an input device for entering the first and second one of the plurality of network conditions.

13. The system as recited in claim 11 wherein the first and second addresses identify the first and second host computers as being configured on a first subnetwork of the local area network segment and wherein the simulator has a simulation address associated therewith identifying the simulator as being configured on the first subnetwork, and wherein the packets of data are transmitted based on the first and second addresses and the simulation address.

14. The system as recited in claim 13 wherein the first and second addresses include real and virtual addresses and wherein the packets of data are transmitted based on the real and virtual addresses and the simulation address.

15. The system as recited in claim 11 wherein the first address identifies the first host computer as being configured on a first subnetwork of the local area network segment and the second address identifies the second host computer as being configured on a second subnetwork, different from the first subnetwork and wherein the simulator includes a first and second gateway address associated therewith, the first gateway address for allowing the first host computer to communicate with the second subnetwork, the second gateway address for allowing the second host computer to communicate with the first subnetwork, and wherein the packets of data are transmitted based on the first and second addresses and the first and second gateway addresses.

16. The system as recited in claim 11 wherein the simulator is further operative to transmit the packets of data to the other one of the f irst and second host computers.

17. The system as recited in claim 16 further comprising a display for displaying the simulation data at the other one of the first and second host computers.

18. The system as recited in claim 11 wherein the first and second one of the plurality of network conditions include a network delay.

19. The system as recited in claim 11 wherein the first and second one of the plurality of network conditions include a plurality of access speeds for the first and second one of the plurality of local area network segments, respectively.

20. The system as recited in claim 19 wherein the first and second access speeds are different.

21. The system as recited in claim 11 wherein the first and second one of the plurality of network conditions include a packet loss rate.

* * * * *